US010296913B1

(12) United States Patent
Breitman et al.

(10) Patent No.: US 10,296,913 B1
(45) Date of Patent: May 21, 2019

(54) INTEGRATION OF HETEROGENOUS DATA USING OMNI-CHANNEL ONTOLOGIES

(71) Applicant: EMC Corporation, Hopkinton, MA (US)

(72) Inventors: Karin Breitman, Rio de Janeiro (BR); Percy E. Rivera Salas, Rio de Janeiro (BR); Rodrigo Dias Arruda Senra, Rio de Janeiro (BR)

(73) Assignee: EMC Corporation, Hopkinton, MA (US)

( * ) Notice: Subject to any disclaimer, the term of this patent is extended or adjusted under 35 U.S.C. 154(b) by 322 days.

(21) Appl. No.: 15/078,211

(22) Filed: Mar. 23, 2016

(51) Int. Cl.
  *G06F 17/30* (2006.01)
  *G06Q 30/00* (2012.01)
(52) U.S. Cl.
  CPC ....... *G06Q 30/01* (2013.01); *G06F 17/30604* (2013.01)
(58) Field of Classification Search
  None
  See application file for complete search history.

(56) References Cited

U.S. PATENT DOCUMENTS

| 8,275,737 B2* | 9/2012 | Kupershmidt | G06N 5/02 706/60 |
| 9,183,349 B2* | 11/2015 | Kupershmidt | G06F 19/28 |
| 9,189,531 B2* | 11/2015 | Joshi | G06F 17/30566 |
| 9,501,539 B2* | 11/2016 | Joshi | G06F 17/30566 |
| 9,501,567 B2* | 11/2016 | Lemcke | G06F 17/30731 |
| 2008/0082569 A1* | 4/2008 | Mansour | G06Q 10/10 |

(Continued)

OTHER PUBLICATIONS

Beck et al., "Categorization of multiple channel retailing in Multi-, Cross-, and Omni Channel Retailing for retailers and retailing", Journal of Retailing and Consumer Services, vol. 27, pp. 170-178, ISSN 0969-6989, Nov. 2015, http://dx/dpo/prg/10.1016/j.jretconser.2015.08.001.

(Continued)

*Primary Examiner* — Hung D Le
(74) *Attorney, Agent, or Firm* — Ryan, Mason & Lewis, LLP

(57) ABSTRACT

Methods and apparatus are provided for integrating heterogeneous multi-channel data using ontologies. An exemplary method for integrating multi-channel heterogeneous data comprises obtaining a domain-specific mediator ontology; identifying a plurality of target channels; identifying entities pertinent to each of the plurality of channels; describing the entities pertinent to each of the plurality of channels using an ontology description language to generate a plurality of channel specific ontologies; aligning the channel specific ontologies with the domain-specific mediator ontology to generate aligned channel specific and domain-specific mediator ontologies; extracting a plurality of user identities from the plurality of channels; aligning the plurality of extracted user identities across the plurality of channels to link common user identities; generating at least one user profile for at least one of the aligned user identities; and correlating at least one user profile with the aligned channel specific and domain-specific mediator ontologies to generate an omni-channel ontology that integrates the multi-channel heterogeneous data.

20 Claims, 9 Drawing Sheets

(56) References Cited

U.S. PATENT DOCUMENTS

| | | | | |
|---|---|---|---|---|
| 2012/0284259 A1* | 11/2012 | Jehuda | ............. | G06F 17/30734 707/722 |
| 2013/0204909 A1* | 8/2013 | Lemcke | ............ | G06F 17/30731 707/805 |
| 2014/0129547 A1* | 5/2014 | Sacco | .............. | G06F 17/30643 707/722 |
| 2014/0379699 A1* | 12/2014 | Blyumen | ............ | G06F 3/04842 707/722 |
| 2015/0235143 A1* | 8/2015 | Eder | ..................... | G16H 50/50 706/12 |
| 2016/0070769 A1* | 3/2016 | Joshi | ................ | G06F 17/30566 707/602 |
| 2016/0103920 A1* | 4/2016 | Lee | .................. | G06F 17/30867 707/706 |
| 2016/0224645 A1* | 8/2016 | Dang | ................ | G06F 17/30569 |
| 2017/0103412 A1* | 4/2017 | Norgaard | ........... | G06Q 30/0244 |
| 2017/0206557 A1* | 7/2017 | Abrol | ................ | G06Q 30/0261 |

OTHER PUBLICATIONS

Breitman et al., "Semantic web: Concepts, technologies and appliances" (nasa monographs in systems and software engineering). Springer-Verlag New York, Inc., Secaucus, NJ, USA, 2006.

Swartout et al., "Toward Distributed Use of LargeScale Ontologies", AAAI Tehnical Report SS-97-06 (1996).

Wache et al., "Ontology-based integration of information—a survey of existing approaches", In IJCAI-01 workshop: ontologies and information sharing (vol. 2001, pp. 108-117).

Verhoef et al., "From Multi-Channel Retailing to Omni-Channel Retailing: Introduction to the Special Issue on Multi-Channel Retailing", Journal of Retailing, vol. 91, Issue 2, pp. 174-181, Jun. 2015, http://dx.doi.org/10.1016/j.iretai.2015.02.005.

Uschold et al., "Towards a Methodology for Building Ontologies", in Skuce, D (Ed) IJCAI'95 Workshop on Basic Ontological Issues in Knowledge Sharing. Montreal, Canada, pp. 6.1-6.10 (1995).

Kalfoglou et al., "Ontology mapping: The state of the art" In Semantic Interoperability and Integration, No. 04391 in Dagstuhl Seminar Proceedings (2005).

Aleksovski et al., "Matching Unstructured Vocabularies using a Background Ontology", Proceedings of Knowledge Engineering and Knowledge Management (EKAW), pp. 182-197 (2006).

Wu et al., "A study of ontology-based query expansion", Technical report CS-2011-04, University of Waterloo.

Ichise et al., "Integrating multiple internet directories by instance-based learning", Proceedings of the eighteenth International joint Conference on Ar.

Van Diggelen et al., "Combining normal communication with ontology alignment", Lecture Notes in Computer Science, 3859:181 (2006).

McGuiness et al., "OWL web ontology language overview", W3C Recommendation, available at http://www.w3.org/TR/owl-features/ (2004).

A. Maedche, "Ontology Learning for the Semantic Web", Kluwer Academic, Boston, MA, USA (2002).

Breitman et al., "Semantic Web: Concepts, Technologies and Applications", Springer Verlag, 2007.

* cited by examiner

FIG. 6

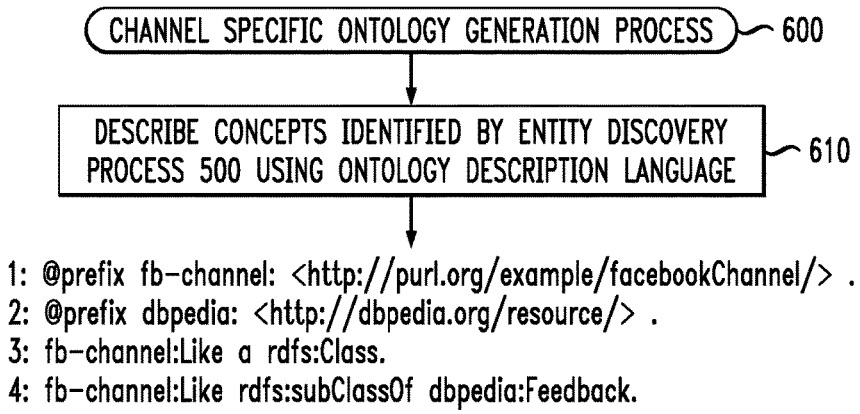

1: @prefix fb-channel: <http://purl.org/example/facebookChannel/> .
2: @prefix dbpedia: <http://dbpedia.org/resource/> .
3: fb-channel:Like a rdfs:Class.
4: fb-channel:Like rdfs:subClassOf dbpedia:Feedback.

FIG. 7

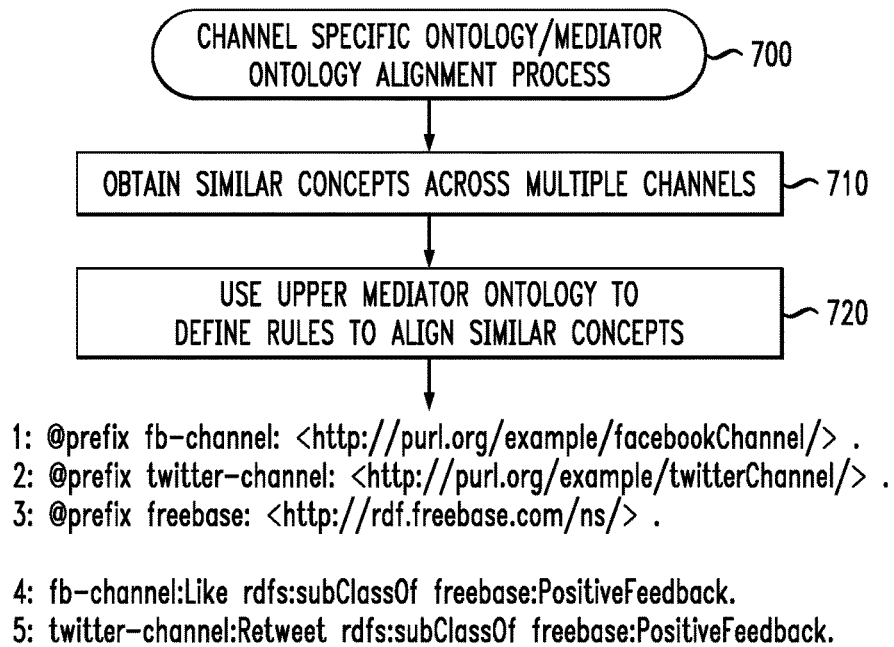

1: @prefix fb-channel: <http://purl.org/example/facebookChannel/> .
2: @prefix twitter-channel: <http://purl.org/example/twitterChannel/> .
3: @prefix freebase: <http://rdf.freebase.com/ns/> .

4: fb-channel:Like rdfs:subClassOf freebase:PositiveFeedback.
5: twitter-channel:Retweet rdfs:subClassOf freebase:PositiveFeedback.

FIG. 10

IDENTITY ALIGNMENT TABLE – 1000

|  | FACEBOOK | TWITTER |
|---|---|---|
| CHANNEL ID | john.smith@work.com | jsmith42 |
| NAME | John Smith | Smith, John |
| EMAIL | john.smith@work.com | jsmith@aboutme.com |
| BIRTHDATE | 01/01/1970 |  |
| RECOVERY EMAIL: | jsmith@aboutme.com | jsmith@aboutme.com |

FIG. 11

USER PROFILE – 1100

|  | OMNI PROFILE |
|---|---|
| OMNI ID | ID703246798 |
| FACEBOOK CHANNEL | john.smith@work.com |
| TWITTER CHANNEL | jsmith42 |
| NAME | John Smith |
| EMAIL | john.smith@work.com |
| SECOND EMAIL | jsmith@aboutme.com |
| BIRTHDATE | 01/01/1970 |

FIG. 12

```
1: @prefix fb-channel: <http://purl.org/example/facebookChannel/> .
2: @prefix twitter-channel: <http://purl.org/example/twitterChannel/> .
3: @prefix freebase: <http://rdf.freebase.com/ns/> .
4: @prefix omni: <http://purl.org/example/OmniChannel/> .

5: omni:ID703246798    rdf:type              freebase: Person;
6:                     rdfs:label            "John Smith" ;
7:                     twitter-channel:ID    "jsmith42" ;
8:                     fb-channel:ID         "john.smith@work.com";
9:                     omni:email            "john.smith@work.com";
10:                    omni:email2           "jsmith@aboutme.com";
11:                    omni:birthdate        "01/01/1970".
```

FIG. 13

```
@prefix fb-channel: <http://purl.org/example/facebookChannel/> .
@prefix twitter-channel: <http://purl.org/example/twitterChannel/> .
@prefix freebase: <http://rdf.freebase.com/ns/> .
@prefix omni: <http://purl.org/example/OmniChannel/> .
@prefix dbpedia: <http://dbpedia.org/resource/> .

fb-channel:Like a rdfs:Class;
rdfs:subClassOf dbpedia:Feedback.

fb-channel:Like rdfs:subClassOf freebase:PositiveFeedback.
twitter-channel:Retweet rdfs:subClassOf freebase:PositiveFeedback.

omni:ID703246798   rdf:type              freebase:Person;
                   rdfs:label            "John Smith" ;
                   twitter-channel:ID    "jsmith42";
                   fb-channel:ID         "john.smith@work.com";
                   omni:email            "john.smith@work.com";
                   omni:email2           "jsmith@aboutme.com";
                   omni:birthdate        "01/01/1970".
```

US 10,296,913 B1

INTEGRATION OF HETEROGENOUS DATA USING OMNI-CHANNEL ONTOLOGIES

FIELD

The invention relates generally to data integration techniques, and, more particularly, to techniques for integrating heterogeneous multi-channel data.

BACKGROUND

Retail business models have changed dramatically in the past decade. The advent of the Internet, and particularly the appearance of additional digital channels, such as mobile and social media channels, have changed the execution of the retail mix and, more importantly, shopper behavior. Business experts advocate a seamless, retail world where customers can shop across all of the channels in which businesses relate to their customers (such as Internet, mobile, radio, brick and mortar, print media and call center channels), anywhere, any time, and from any device. This type of multiple channel retailing is often referred to as Omni-Channel Retailing. See, for example, Norbert Beck and David Rygl, "Categorization of Multiple Channel Retailing in Multi-, Cross-, and Omni-Channel Retailing for Retailers and Retailing," Journal of Retailing and Consumer Services, Vol. 27, 170-78 (November 2015).

Ontologies have been used in different areas of computer science, such as artificial intelligence, knowledge representation, natural language processing, Semantic Web, and software engineering, among others. In this context, the role of ontologies is to make the vocabularies used explicit and to provide an information-sharing standard. Indeed, ontologies provide a common model that allows software and applications to share data in a significant way. See, for example, Karin Breitman et al., Semantic Web: Concepts, Technologies and Applications (2007; Springer Verlag).

A need exists for improved techniques for integrating heterogeneous data comprised of, for example, telemetry, sensor data, video, audio, text and other formats of structured and unstructured data. A further need exists for improved techniques for integrating heterogeneous data using ontologies as a means to establish efficient information sharing among heterogeneous and distributed data sources.

SUMMARY

Illustrative embodiments of the present invention provide methods and apparatus for integrating heterogeneous multi-channel data using ontologies. In one exemplary embodiment, a method for integrating multi-channel heterogeneous data comprises obtaining a domain-specific mediator ontology; identifying a plurality of target channels; identifying entities pertinent to each of the plurality of channels; describing the entities pertinent to each of the plurality of channels using an ontology description language to generate a plurality of channel specific ontologies; aligning the channel specific ontologies with the domain-specific mediator ontology to generate aligned channel specific and domain-specific mediator ontologies; extracting a plurality of user identities from the plurality of channels; aligning the plurality of extracted user identities across the plurality of channels to link common user identities; generating at least one user profile for at least one of the aligned user identities; and correlating at least one user profile with the aligned channel specific and domain-specific mediator ontologies to generate an omni-channel ontology that integrates the multi-channel heterogeneous data.

In one or more embodiments, the step of aligning the channel specific ontologies with the domain-specific mediator ontology uses the upper mediator ontology to define rules to align similar concepts across a plurality of the channel. In at least one embodiment, an omni identifier is assigned to a given aligned user identity to identify a given user associated with the given aligned user identity across the plurality of channels.

In one or more embodiments, the omni-channel ontology is stored in a database and optionally processed in response to user queries.

As noted above, illustrative embodiments described herein provide significant improvements relative to conventional storage systems by integrating heterogeneous data using ontologies as a means to establish efficient information sharing among heterogeneous and distributed data sources. These and other features and advantages of the present invention will become more readily apparent from the accompanying drawings and the following detailed description.

BRIEF DESCRIPTION OF THE DRAWINGS

FIG. 6 is a flow chart illustrating an exemplary implementation of a channel specific ontology generation process, according to one embodiment of the invention;

FIG. 7 is a flow chart illustrating an exemplary implementation of a channel specific ontology/mediator ontology alignment process, according to one embodiment of the invention;

FIG. 10 illustrates records for an exemplary identity alignment table, according to one embodiment of the invention;

FIG. 11 illustrates records for an exemplary user profile, according to one embodiment of the invention;

FIG. 12 illustrates an exemplary correlation of entities and profiles;

FIG. 13 illustrates an exemplary omni-channel ontology, according to one embodiment of the invention;

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for integrating heterogeneous multi-channel data using ontologies. While aspects of the present invention are illustrated in a retail environment, the present invention can be employed in any multi-channel environments that consider both domain-specific information, i.e., named entities that are relevant in one specific domain (such as account number, investment grade, and bank statement), as well as information pertaining to individuals.

In one or more embodiments, ontologies are used to establish efficient information sharing among heterogeneous and distributed data sources (e.g., data sources comprised of telemetry, sensor data, video, audio, text and other formats of structured and unstructured data), known as the interoperability problem. A general discussion of ontologies is provided below, in the section entitled "Ontology Construction, Enrichment and Integration." The challenges of interoperability are often manifested in two dimensions: structural heterogeneity (e.g., different information systems store their data in different structures), and semantic heterogeneity that considers the content of an information item and its intended meaning. One or more aspects of the invention address semantic heterogeneity, e.g., providing a mechanism that allows the meaning of the information that is interchanged to be understood across a data lake (discussed further below in conjunction with FIG. 3).

An ontology is an artifact comprising (1) the concepts, relationships, and attributes of the entities that are relevant to the several data sources, and (2) the information related to distinct individuals (persons) as they traverse the different channels (e.g., account name, social security number, social media handle, name). Omni-channel ontologies are disclosed herein that serve as a hub in the mediation, integration, querying, and data reconciliation of the heterogeneous and distributed data sources.

At least one embodiment considers both domain-specific information (i.e., the named entities that are relevant in one specific domain), and information pertaining to individuals. As used herein, the term "individuals" refers to separate persons and their different incarnations across channels, including their name (e.g., for a call center), account number (e.g., for ATMs (Automated Teller Machines) and Internet), telephone number and token (mobile), and handle (social media).

Figure 1:
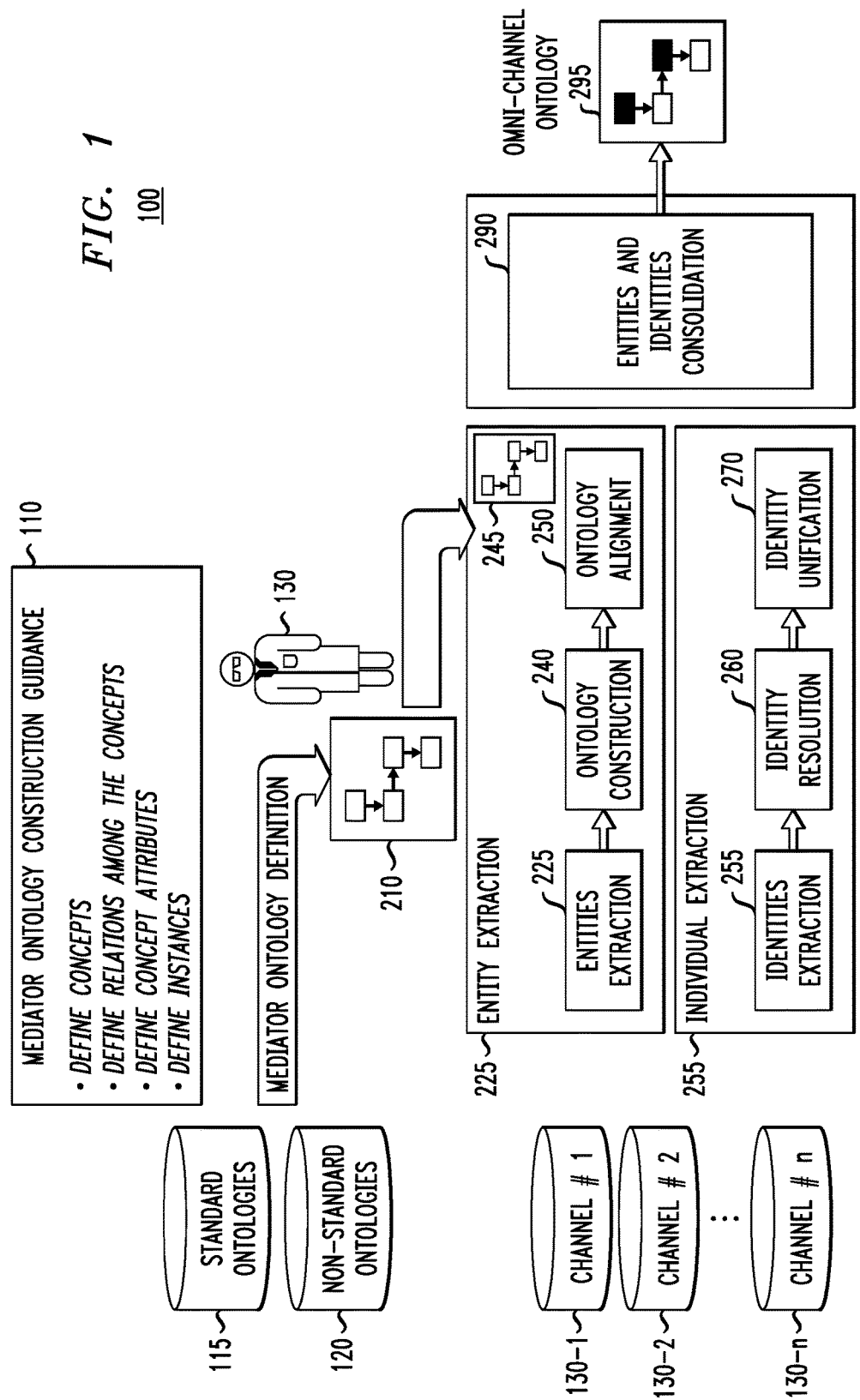
FIG. 1 illustrates an exemplary omni-channel ontology generation system, according to one embodiment of the invention.

FIG. 1 illustrates an exemplary omni-channel ontology generation system 100 according to one embodiment of the invention. Generally, the omni-channel ontology generation system 100 employs mediator ontology construction guidance 110 that comprises defining concepts, defining relations among the concepts, defining concept attributes and defining instances.

As discussed further below in conjunction with FIG. 2, a user 130 defines a mediator ontology 210 from existing standard ontologies 115 and non-standard ontologies 120. In one exemplary implementation, the mediator ontology 210 can be implemented using the Freebase, which is a large collaborative knowledge base.

One or more embodiments of the invention consider both domain-specific information (i.e., the named entities that are relevant in one specific domain), and information pertaining to individuals. As used herein, the term "individuals" refers to separate persons and their different incarnations across channels, including their name (e.g., for a call center), account number (e.g., for ATMs (Automated Teller Machines) and Internet), telephone number and token (mobile), and handle (social media).

Figure 2:
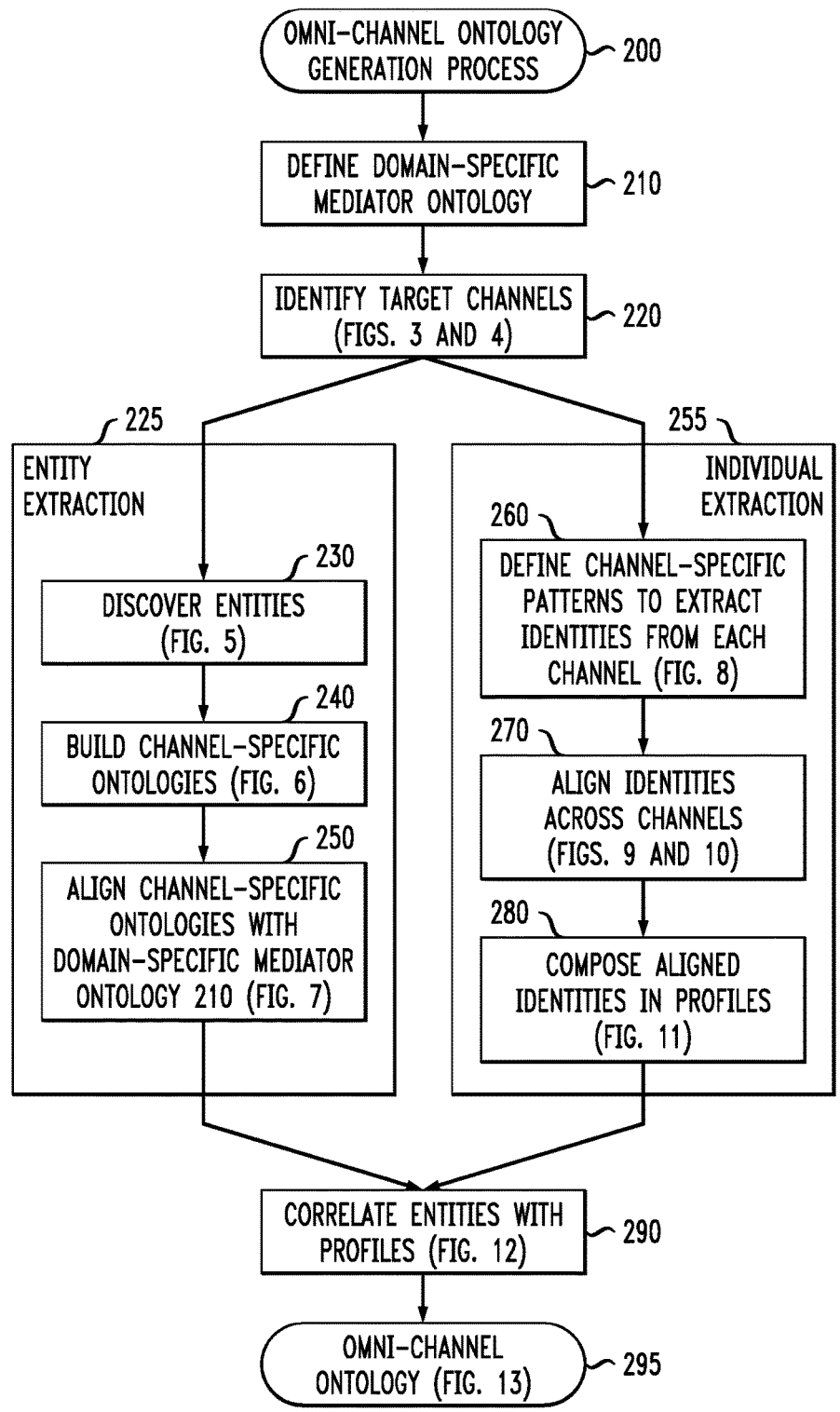
FIG. 2 is a flow chart illustrating an exemplary implementation of an omni-channel ontology generation process, according to one embodiment of the invention.
Figure 3:
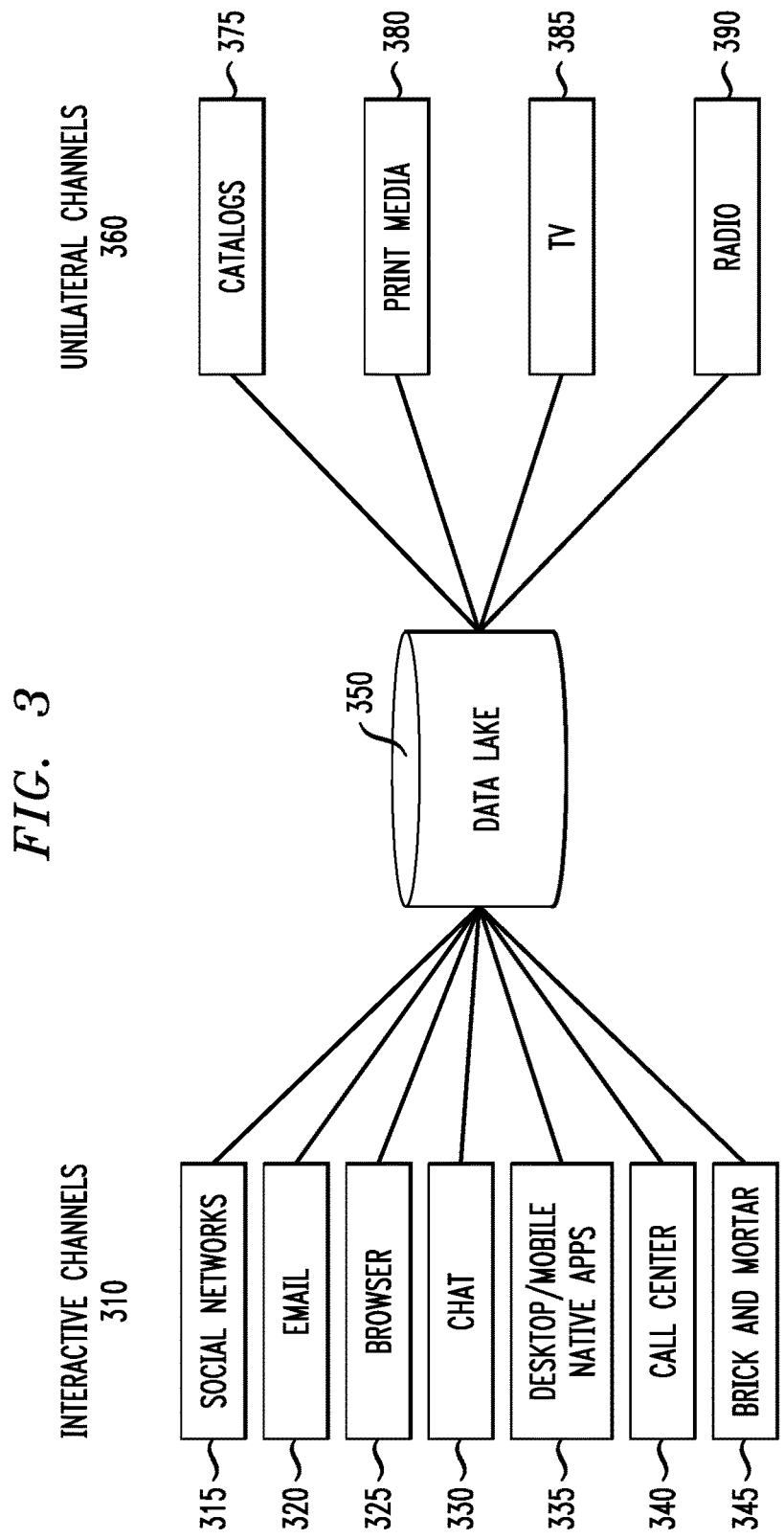
FIG. 3 illustrates a plurality of exemplary retail channels ingested into a multi-channel data lake.

In the exemplary embodiment of FIG. 1, a plurality of channels 130-1 through 130-$n$, as discussed further below in conjunction with FIG. 3, are processed to perform entity extraction 225 and individual extraction 255 from the various multi-channel heterogeneous data. As shown in FIG. 1, and as discussed further below in conjunction with FIG. 2, the entity extraction 225 comprises an entities extraction 225 phase, an ontology construction 240 phase and an ontology alignment 250 phase to produce an ontology 245 that aligns channel-specific ontologies with the domain-specific mediator ontology 210. In addition, the individual extraction 255 comprises an identities extraction 255 phase, an identity resolution 260 phase and an identity unification 270 phase, resulting in an omni user profile, discussed further below in conjunction with FIG. 11.

The extracted entities and identities are then consolidated using an Entities & Identities Consolidation module 290, resulting in an omni-channel ontology 295, discussed further below in conjunction with FIG. 13.

FIG. 2 is a flow chart illustrating an exemplary implementation of an omni-channel ontology generation process 200 according to one embodiment of the invention. As shown in FIG. 2, the exemplary omni-channel ontology generation process 200 initially defines the domain-specific mediator ontology 210. For example, a user can (i) identify a pre-existing upper ontology that describes the retail domain. Public ontology repositories are available, such as from the Open Knowledge Foundation and W3C; (ii) identify relevant Linked Open Data (LOD) repositories and extract concepts to create the domain-specific mediator ontology 210; or (iii) use domain experts to manually create the domain-specific mediator ontology 210.

Generally, an ontology should contain classes that capture physical or abstract concepts (e.g., organized in superclass-subclass hierarchies); binary relations that represent association between concepts; attributes that describe the features of the concepts; formal axioms to model sentences that are always true; and instances that represent individuals in an ontology. In addition, to develop an ontology, a user can, for example, determine the domain and the scope or purpose of your ontology; know available sources, such as documents, experts and existing ontologies; define concepts (e.g., classes), reusing from pre-existing ontologies if possible; organize things in a taxonomy; define relations among the classes; define the attributes and which values they can take; define instances (e.g., "real" elements in the domain); and define axioms. For a more detailed discussion of ontology generation, see, for example, Allemang and Hendler, "Semantic Web for the Working Ontologist," 2nd Edition, Effective Modeling in RDFS and OWL (2011).

During step 220, the exemplary omni-channel ontology generation process 200 identifies target channels, as discussed further below in conjunction with FIGS. 3 and 4. For example, the user can interview the customer to select relevant channels through different media, such as brick and mortar stores, call centers and toll-free numbers, and social media, such as Facebook, Twitter, Pinterest and Instagram.

As noted above, one or more embodiments of the invention consider both entity-based domain-specific information and information pertaining to individuals. In the exemplary embodiment of FIG. 2, the omni-channel ontology generation process 200 comprises two parallel flows to perform the entity extraction 225 and individual extraction 255 from the heterogeneous multi-channel data identified in step 220.

The entity extraction stage 225 comprises discovering entities during step 230, as discussed further below in conjunction with FIG. 5; building channel-specific ontologies during step 240, as discussed further below in conjunction with FIG. 6; and aligning channel-specific ontologies with the domain-specific mediator ontology 210 during step 250, as discussed further below in conjunction with FIG. 7. Thereafter, program control proceeds to step 290, discussed below.

The individual extraction stage 255 comprises defining channel-specific patterns during step 260 to extract identities from each channel, as discussed further below in conjunction with FIG. 8; aligning identities across channels during step 270, as discussed further below in conjunction with FIGS. 9 and 10; and composing aligned identities in profiles during step 280, as discussed further below in conjunction with FIG. 11. Thereafter, program control proceeds to step 290, discussed below.

During step 290, the exemplary omni-channel ontology generation process 200 correlates entities with profiles, as discussed further below in conjunction with FIG. 12, to produce the desired omni-channel ontology 295, discussed further below in conjunction with FIG. 13.

Identifying Target Channels

As noted above, during step 220, the exemplary omni-channel ontology generation process 200 identifies the target channels, such as brick and mortar stores, call centers and toll-free numbers, and social media channels.

FIG. 3 illustrates a plurality of channels ingested into a multi-channel data lake 350. The exemplary data lake 350 stores data from a plurality of interactive channels 310 and/or unilateral channels 360. In the exemplary embodiment of FIG. 3, the interactive channels 310 comprise, for example, social networks 315, email 320, browser 325, chat 330 (e.g., instant message), desktop/mobile native applications (apps) 335, call center 340 and brick and mortar shops 345. In addition, the unilateral channels 360 comprise, for example, catalogs 375, print media 380, television (TV) 385 and radio 390.

Good examples of omni-channel retailing, as per the Multi-channel Merchant, range from food stores that let customers choose their menus on mobile devices and select their meals from a selected store; cosmetic shops that create carts visible from multiple devices and in-store, and that allow customers to add items to their shopping list, view their buying history, save items for future purchases, and re-order items; to coffee shops that created an application (app) based on a multi-channel rewards program that allow customers to check and reload their card balance through their phone, online, or when they're at the store. See, Bill Swartout et al., "Toward Distributed Use of Large Scale Ontologies," AAAI Technical Report SS-97-06 (1996). Balance or profile changes are also updated in real-time, across all channels, letting users stay in-the-know no matter where they are or what device they're using. Additionally earned rewards are automatically reflected in the user's account without any action on the user's part.

This level of integration requires the access to data and, more importantly, the ability to integrate disparate information sources in a secure, unambiguous, and coordinated way.

Figure 4:
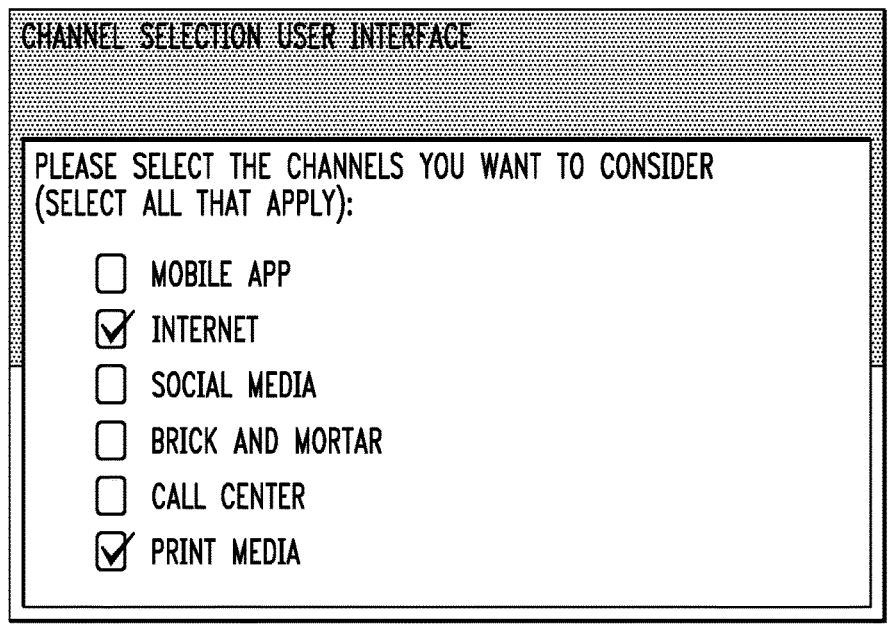
FIG. 4 illustrates an exemplary channel selection user interface that allows a user to select the channels to be considered for the omni-channel ontology.

FIG. 4 illustrates an exemplary channel selection user interface 400 that allows a user to select the channels to be considered.

Entity Extraction

As noted above, one or more embodiments of the invention consider both entity-based domain-specific information and information pertaining to individuals. The entity extraction stage 225 (FIG. 2) discovers entities, builds channel-specific ontologies; and aligns channel-specific ontologies with the domain-specific mediator ontology 210.

Figure 5:
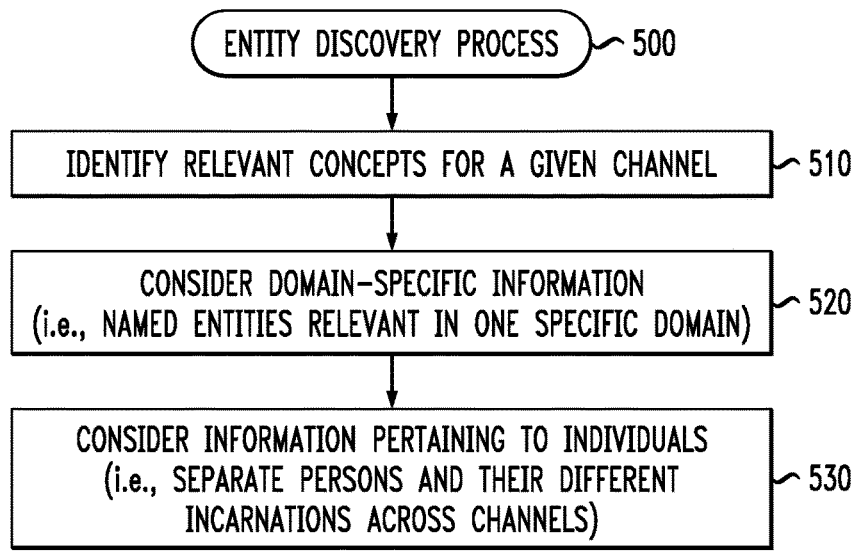
FIG. 5 is a flow chart illustrating an exemplary implementation of an entity discovery process, according to one embodiment of the invention.

FIG. 5 is a flow chart illustrating an exemplary implementation of an entity discovery process 500 according to one embodiment of the invention. As shown in FIG. 5, the exemplary entity discovery process 500 initially identifies relevant concepts for a given channel during step 510. Thereafter, domain-specific information is considered (i.e., named entities relevant in one specific domain) during step 520. Finally, the exemplary entity discovery process 500 considers information pertaining to individuals (i.e., separate persons and their different incarnations across channels) during step 530.

As noted above, during step 240, the exemplary omni-channel ontology generation process 200 (FIG. 2) builds the channel-specific ontologies. FIG. 6 is a flow chart illustrating an exemplary implementation of a channel specific ontology generation process 600 according to one embodiment of the invention. As shown in FIG. 6, the exemplary channel specific ontology generation process 600 describes concepts identified by the entity discovery process 500 of FIG. 5 using an ontology description language, such as the Resource Description Framework (RDF), during step 610. Typically, an ontology description language expresses knowledge as a triple (subject, predicate and object).

In the example of FIG. 6, a Facebook™ like operation is instantiated as an rdfs class in line 3. The subject is "fb-channel:Like" and the predicate and object are "rdfs:Class." The Facebook™ like operation is also instantiated as an rdfs subclass of "feedback" in line 4. In other words, a Facebook™ like operation is a special class of dbpedia's feedback.

As noted above, during step 250, the exemplary omni-channel ontology generation process 200 (FIG. 2) aligns channel-specific ontologies with the domain-specific mediator ontology 210. FIG. 7 is a flow chart illustrating an exemplary implementation of a channel specific ontology/mediator ontology alignment process 700, according to one embodiment of the invention. Generally, if two independent channels have overlapping concepts, they can be aligned with the channel specific ontology/mediator ontology alignment process 700. For example, Twitter™ retweets are similar to Facebook™ likes, as both are used to characterize user positive response to some topic.

As shown in FIG. 7, the channel specific ontology/mediator ontology alignment process 700 obtains similar concepts across multiple channels during step 710 and uses the upper mediator ontology 210 to define rules to align similar concepts during step 720.

In the example of FIG. 7, lines 1 and 2 define the two channels with overlapping concepts and line 3 defines the upper mediator ontology. Lines 4 and 5 comprise rules defining Facebook™ likes and Twitter™ retweets as specializations of Freebase's positive feedback, using RDF triples.

Individual Extraction

As noted above, one or more embodiments of the invention consider both entity-based domain-specific information and information pertaining to individuals. The individual extraction stage 255 (FIG. 2) defines channel-specific patterns to extract identities from each channel, aligns identities across channels, and composes aligned identities in profiles.

As noted above, during step 260, the exemplary omni-channel ontology generation process 200 (FIG. 2) defines channel-specific patterns to extract identities from each channel.

Figure 8:
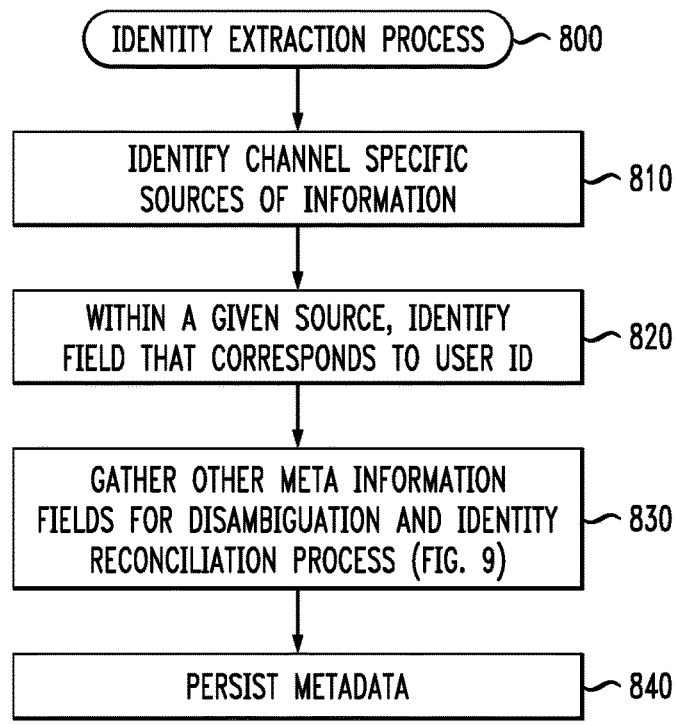
FIG. 8 is a flow chart illustrating an exemplary implementation of an identity extraction process, according to one embodiment of the invention.
Figure 9:
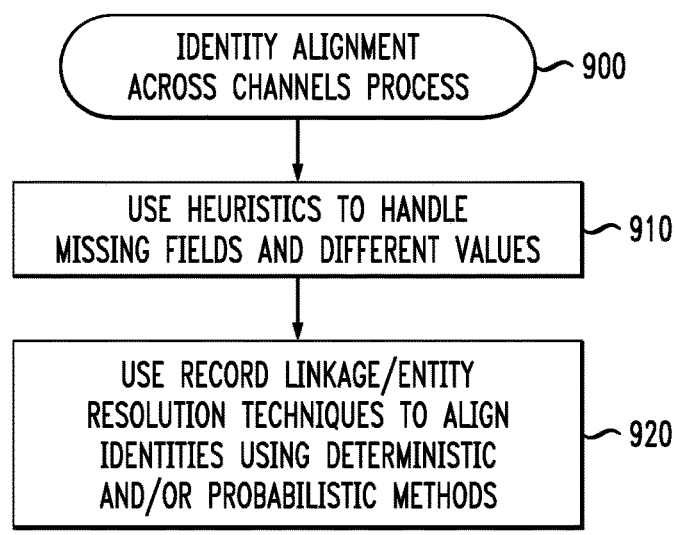
FIG. 9 is a flow chart illustrating an exemplary implementation of an identity alignment across channels process, according to one embodiment of the invention.

FIG. 8 is a flow chart illustrating an exemplary implementation of an identity extraction process 800 according to one embodiment of the invention. As shown in FIG. 8, the identity extraction process 800 initially identifies channel specific sources of information during step 810. Thereafter, within a given identified source, fields are identified that corresponds to user ID during step 820. Other meta information fields for disambiguation and identity reconciliation process (FIG. 9) are gathered during step 830. Finally, the gathered metadata is persisted to storage during step 840.

For example, the user identity for the Facebook™ channel can be alternatively expressed, as follows:
Name: John Smith
Birthdate: Jan. 1, 1970
E-mail: john.smith@work.com Similarly, the user identity for the Twitter™ channel can be alternatively expressed, as follows:
Twitter username: jsmith42
Name: Smith, John
E-mail: jsmith@aboutme.com Align Identities Across Channels As noted above, during step 270, the exemplary omni-channel ontology generation process 200 (FIG. 2) aligns identities across channels. FIG. 9 is a flow chart illustrating an exemplary implementation of an identity alignment across channels process 900, according to one embodiment of the invention. As shown in FIG. 9, the exemplary identity alignment across channels process 900 initially uses heuristics to handle missing fields and different values during step 910. Thereafter, record linkage/entity resolution techniques are employed during step 920 to align identities using deterministic and/or probabilistic methods.

FIG. 10 illustrates records for an exemplary identity alignment table 1000, according to one embodiment of the invention. As shown in FIG. 10, each column in the exemplary identity alignment table 1000 corresponds to a different channel, such as a Facebook™ channel and a Twitter™ channel, and each successive row provides a channel identifier, name, email, birthdate, and recovery email for a given user, John Smith, on each channel.

As noted above, during step 280, the exemplary omni-channel ontology generation process 200 (FIG. 2) composes aligned identities in profiles. FIG. 11 illustrates records for an exemplary user profile 1100 according to one embodiment of the invention. As shown in FIG. 11, the exemplary user profile 1100 comprises entries for omni ID, Facebook™ channel, Twitter™ channel, name, email, second email and birthdate, for a given user, John Smith. The omni ID serves as a unifier for the given user across all channels.

During step 290, the exemplary omni-channel ontology generation process 200 (FIG. 2) correlates entities with profiles. Generally, the correlation of step 290 translates the user profile 1100 into an exemplary RDF notation using triples. In other words, the identities are captured and materialized in RDFS. FIG. 12 illustrates an exemplary correlation 1200 of entities and profiles. As shown in FIG. 12, the exemplary correlation 1200 defines two channels in lines 1 and 2 and line 3 defines the upper mediator ontology. Line 4 defines the omni profile. Thereafter, lines 5-11 define the various parameters from the exemplary user profile 1100 for the given omni identifier.

FIG. 13 illustrates an exemplary omni-channel ontology 295 according to one embodiment of the invention. Generally, the exemplary omni-channel ontology 295 maps real world entities, individuals and business rules to RDF and combines pieces of prior tables in one omni record. The exemplary omni-channel ontologies 295 can be queried to reason about information contained therein, in a known manner. In addition to the parameters in the exemplary correlation 1200 of entities and profiles of FIG. 12, the exemplary omni-channel ontologies 295 defines the dbpedia ontology and includes the exemplary correlations of Facebook™ like operations and Twitter™ retweets.

Among other benefits, the disclosed omni-channel ontology generation techniques allow information that was previously stored in separate silos (accessible and treated uniquely within one particular channel), to be shared, integrated, correlated and used to give a better picture of the intent and actions of the customer.

This capability will greatly aid in the construction of customer profiles that, if used in conjunction of advanced modeling techniques can help identify customer churn; new and existing customer profiles; new opportunities; and preferences and tastes that can fuel recommendation systems.

In addition, discovering such relationships allows an exchange between different channels and creates what is commonly referred to as a seamless or omni-channel experience. The ability to have a holistic understanding of the customer interactions and dependencies between the channels is a helpful tool in acquiring a deep understanding of a very complex multi-channel environment. It can be used to identify problems (faults) in existing systems and, with added intelligence, could aid the detection of potential frauds.

As the pace of innovation in mobile and cloud computing grows at exponential pace, it is reasonable to assume that new interaction channels are bound to appear in the coming years. The disclosed omni-channel ontology generation techniques help with the integration of new channels to existing ones, thus supporting the notion of the multi-channel integration, while allowing for growth and expansion.

The disclosed omni-channel ontology, used in conjunction with the multi-channel data lake 350, provide excellent tooling to monitor the operation and the evolution of the interaction between institutions and their customer base over time. Additional constructs, such as a dashboard to monitor usage, frequency and the quality of information exchange, can serve to give a very accurate portrait of the relationship of any given institution as it relates to how its customers (and potentially vendors and partners) are seeing it.

Because of its nature, the disclosed omni-channel ontology 295 can be used to provide an overview of the totality of channels, their usage, and interdependencies. One aspect that could be made salient is the evolution of any given channel and its relevance to the business. For instance, the effectiveness of call centers as compared to mobile interaction.

Ontology Construction, Enrichment and Integration

Ontology Definition

As noted above, the role of ontologies is to make the vocabularies used explicit and to provide an information-sharing standard. Indeed, ontologies provide a common model that allows software and applications to share data in a significant way. The classification process that underlies ontology construction should take into consideration the automation possibilities, and not the way humans organize their own knowledge. An ontology is composed of classes, relationships and properties.

Ontologies have been used in different areas of computer science, such as artificial intelligence, knowledge representation, natural language processing, Semantic Web, and software engineering, among others. In this context the role of ontologies is to make the vocabularies used explicit and to provide an information-sharing standard. Indeed, ontologies provide a common model that allows software and applications to share data in a significant way, as noted above.

The World Wide Web Consortium (W3C consortium) defines ontology as follows: "a term borrowed from philosophy that refers to the science of describing the kinds of entities in the world and how they are related." See, for example, D. McGuinness and F. V. Harmelen, OWL Web Ontology Language Overview, W3C Recommendation (10 Feb. 2004). W3C also suggests that ontologies should provide descriptions for classes in the various domains of interest, relationships among those classes and properties that classes should possess.

A. Maedche, Ontology Learning for the Semantic Web. Kluwer Academic (2002; Boston, Mass., USA) proposed that an ontology should be described by a five-tuple:

$$O=\{C, R, CH, rel, OA\},$$

where C and R are two disjoint sets, called the set of concepts and the set of relations, respectively, $CH \subseteq C \times C$ is a concept hierarchy or taxonomy, where $CH(C1,C2)$ indicates that C1 is a subconcept of C2. Rel: $R \rightarrow C \times C$ is a function that relates the concepts non-taxonomically, and OA is a set of ontology axioms, expressed in an appropriate logical language.

Most existing semantic web ontology representation languages are consistent with this definition.

Ontology Construction

Ontology, as defined by Gruber, is an "explicit specification of a conceptualization." According to K. Breitman et al., "Semantic Web: Concepts, Technologies and Applications (NASA Monographs in Systems and Software Engineering), (2006; Springer-Verlag New York, Inc.), conceptualization stands for an abstract model; explicit means that the elements must be clearly defined; and formal indicates that the specification should be machine processable. Going further, the authors stated that in Gruber's view, an ontology is the representation of the knowledge of a domain, where a set of objects and their relationships is described by a vocabulary.

Bill Swartout et al., "Toward Distributed Use of LargeScale Ontologies," AAAI Technical Report SS-97-06 (1996), divides ontology into two categories: domain ontology and theory ontology. Domain ontology deals with the formal description of the classes, the relationship between the classes, while theory ontology tends to be abstract and smaller.

Ontologies can be constructed by using three different approaches. See, for example, H. Wache et al., "Ontology-Based Integration of Information—A Survey of Existing Approaches," IJCAI-01 Workshop: Ontologies and Information Sharing, 108-17 (2001). Ontologies comprise single ontology approaches, multiple ontology approaches and hybrid ontology approaches. These approaches help in providing the integration task to describe the semantics of the information sources. Ontology construction is an iterative process and involves the following steps.

Design: Specifies the scope and purpose of the ontology. Also reveals the relationship among classes and subclasses.

Develop: Decides whether construction of ontology has to be done from scratch or to reuse an existing ontology.

Integrate: Combine the developed ontology with the already existing one.

Validate and Feedback: The completeness of the constructed ontology is verified with the help of automated tools or by seeking the opinion of the experts.

Iterate: Repeat the process and incorporate the changes given by the expert.

The single ontology approach is the simplest of all and it uses single global ontology for all information sources, which shares the vocabulary and the terminology to specify the semantics. The limitation of this approach is that it does not provide a perfect solution for information integration. This limitation has paved way for multiple ontology approaches, where each information source is described by its own ontology, thus each source will have its own local ontology. The main drawback of this approach is the construction of individual ontology. The hybrid ontology approach is the combination of single and multiple approaches.

In general, ontology construction can be performed manually, semi-automatically (human intervention is needed) or fully automatically.

M. Uschold, and M. King, "Towards a Methodology for Building Ontologies," in D. Skuce, D. (Ed.) IJCAI'95 Workshop on Basic Ontological Issues in Knowledge Sharing, 6.10-6.10, (1995, Montreal, Canada), proposes a construction process composed of four distinct stages: identification, construction, evaluation, and documentation. In more detail, the stages are as follows:

1. Identify purpose and scope of the ontology: Define why the ontology is being built and for what it is going to be used. An ontology may be designed with the intention of knowledge sharing, knowledge reusing, or as part of an existing knowledge base. This stage takes care of identifying whether the ontology has to be built from the scratch or an existing ontology can be reused.

2. Build the ontology:

a. Capture: Define concepts and their relationships in the domain of interest. Note that textual descriptions should not use the traditional dictionary approach, but rather they must maximize the use of other concepts present in the description. By doing so, the relationships between key concepts will be made explicit.

b. Code: Formalize the concepts and relationships defined in the previous step, choosing a representation language that will support the ontology.

c. Integrate: Question the possibility of reusing existing ontologies. This activity can, and should, be made in parallel with the others 3. Evaluate the ontology: Use technical criteria to verify the specification, using competency questions and real-world validations.

4. Document the ontology: Describe the ontology construction process. The final format may vary according to the type of ontology in question. Users may determine their own conventions, such as representing class names in capital letters and relationships in italics.

Ontology Enrichment

Ontology enrichment is the process of extending an ontology, through the addition of new concepts, relations and rules. It is performed every time that existing domain knowledge is not sufficient to describe the information extracted from the data sources in a multi-channel data lake. Thus, the ontology enrichment activity is expected to extend the background knowledge, in order to better explain extracted information in the future. Since new concepts and relations can be added during enrichment, the structure of the ontology changes.

The main approach adopted by state-of-the-art methods starts with the identification of objects and their alternative synonyms. Each object, along with a possible set of alternative synonyms, is a candidate concept to be added to an ontology. Similarly, each proposed cluster of objects (instances) and alternative synonyms that possibly represent a concept must be evaluated in order to decide whether it constitutes a concept or not. In case the object represents a concept, the concept must be formulated by creating an intentional definition and possibly augmented with evidence/instances that justify the addition of the new concept. Relations (either taxonomic or non-taxonomic) must be identified between concepts, usually based on spatio-temporal information for modalities like image and video or linguistic information (either syntactic or semantic) for text. Finally, in order to support reasoning and derive facts not explicitly encoded but derivable from the ontology, rules and constraints must be acquired.

This enriched ontology can be used to apply query expansion techniques, such as those described in J. Wu et al., "A Study of Ontology-Based Query Expansion," Technical Report CS-2011-04, University of Waterloo (2011), in order to automatically reformulate a user query into one that is more amenable for information retrieval.

Ontology Integration

A true multi-channel experience requires the ability to transit seamlessly between channels, e.g., call center, social networks, mobile banking applications and ATM. Given that, for each channel, a separate ontology is developed, the ability to integrate the ontologies into a single representation (referred to herein as an omni-channel ontology) is important to ensure overall communication. This need, often referred to the ontology alignment problem, comprises finding a set of equivalence between a set of nodes in ontology A and a set of nodes in ontology B. See, for example, Y. Kalfoglou, and M. Schorlemmer, "Ontology Mapping: The State of the Art," in Y. Kalfoglou et al., editors, Semantic Interoperability and Integration, No. 04391 in Dagstuhl Seminar Proceedings (2005).

More formally, the problem of ontology alignment can be compared to that of database schema matching. Given two schemas, A and B, one wants to find a mapping from the concepts in A into the concepts of B in such a way that, for all (a, b) in A*B, if a=(b), then b and a have the same meaning. Several approaches have been proposed to perform such alignments, which can be organized into three categories: structural methods (which rely only on the structure of the ontology and the nodes labels), instance-based methods (which compare the instances of each concept in the ontologies) and methods based on a reference ontology which acts as a mediator. This field is wide and complex, but its application to the interaction of entities in ubiquitous environments leads to the specification of a sub-category of problems:

The alignment process must be performed on the fly and in a limited amount of time. Indeed, in open systems, it is not possible to know in advance the nature of the entities that interact, which makes impossible to compute in advance the alignment of their ontologies.

The entities that interact share common goals or common capacities. Thus, one can consider in most applications that the intersection of ontologies will not be empty. As a consequence, there always exists an acceptable alignment between two ontologies. However, one cannot take for sure that concepts will appear at the same level of specialization. For instance, one ontology can have a single class for the concept of research paper, while the other directly works with the sub-concepts journal, conference proceedings, etc.

The ontology alignment must be performed automatically (whereas a lot of work in this domain relies on semi-automatic approaches). As a consequence, entities must decide on alignments without the validation of a human expert. Thus, they must be able to evaluate the trust they have in the resulting alignment, e.g. by valuating the equivalence links depending on their ambiguity.

The next subsections present the lexical alignment (often referred to as anchoring) that is used as a basis by all ontology alignment approaches, including the three main approaches for ontology alignment (structural, instance-based and mediation-based). The advantages and drawbacks of each technique and a brief overview of most significant work in each category are presented.

A. Lexical Alignment

There are three classical solutions for lexical alignment: alignment based on structural properties, alignment based on instances and alignment based on a "background ontology".

Lexical anchoring is, generally, the first processing step of ontology alignment tools. It is possible to differentiate several kinds of approaches, with advantages and drawbacks. First, classical Natural Language Processing tools, as lemmatization (which constructs singular or infinitive forms of words, for instance, determining that kits is the plural of kit, bought is a derived form of buy), tokenization (which considers each word of a compound concept, like long_brain_tumor subClassOf long_tumor) or suffix/prefix approach (which searches in a sub-part of the words). For instance, like "net" is an abbreviation of network, ID can stand for PID. However, these approaches have some limitations: the lemmatization can be ambiguous (out of the sentence context, left can be lemmatized either into left: adjective or leave:verb); the tokenization requires to choose the correct sub-concepts inference (is brain_tumor subClassOf brain a valid association?); and the prefix/suffix alignment is strongly dependent of the language (for instance, hotel should not match hot, nor can word be seen as an abbreviation of sword). For these reasons, the lexical anchoring has to be used with great care and to be completed and/or confirmed with other techniques.

A complementary approach of all these methods is the lexical distance measure, so called "edit distance" between two strings (Hamming distance or Levenhstein distance). For example, the edit distance is given by the minimum number of operations needed to transform one string into the other, where an operation may be an insertion, deletion, or substitution of a single character. It is widely used for spell checking. The main advantages of edit distance are that it reproduces NLP approaches when words are not too much complex. For instance, the translation from plural to the singular form has a cost of 1 in most words (removing the trailing "s"). However, some drawbacks still remain, like sword is equivalent to word, which has a cost of 1 and could be wrongly accepted.

B. Structural Approaches

Structural approaches are based on the structural comparison of the two concepts graphs (in the meaning of graph theory). It relies on lexical anchoring as a first step for associating lexically-close labels from both ontologies. The complementary alignment pairs are obtained by an extended hierarchy comparison around these anchored concepts. More generally, such structural methods will match terms like PC and Personal Computers when sub-classes and properties described the same concept (like ID, model, etc.). However, structural alignment may fail if the information is not classified using the same criterion or if the ontologies do not cover the same fields or instances.

It can be shown that the concept "Italy" from one ontology will be correctly aligned with the concept "Italy" from another ontology, because they share lexically-close concepts in their whole hierarchical structures. The concept "England," however, from one ontology will be wrongly aligned with the concept "France" from the other ontology, because, although they do not have the same meaning, they also share lexically-close concepts in their whole hierarchical structures.

C. Instances-Based Approaches

The objective of these methods is to determine an alignment using common instances between the two ontologies. When the common instances are identified, the main idea is to suppose that the hierarchy declares these instances under the same concepts (maybe structurally or lexically different). For example, in R. Ichise et al., "Integrating Multiple Internet Directories by Instance-Based Learning," Proc. of the Eighteenth Int'l Joint Conf. on Artificial Intelligence (IJCAI03), (2003), the authors tried to align the Google® categories hierarchy and Yahoo® categories hierarchy. An instance is identified using the URL of websites. Regarding J. van Diggelen et al., "Combining Normal Communication With Ontology Alignment," Lecture Notes in Computer Science, 3859:181 (2006), the positive and/or negative matches of instances between two concepts allows them to compute subsumption alignment, in addition of equivalence alignment. For example, if instances of a roadvehicle concept of an ontology 2 are classified as instances of vehicle concept of an ontology 1, and the opposite is not true, then it is possible to deduce that vehicle is a super-class of roadvehicle. If instances of van concept of ontology 1 are classified as instances of roadvehicle concept of ontology 2, and not the opposite, roadvehicle is identified as a super-class of van.

However, the main drawback of this approach is the instances detection. For example, the work by Ichise et al. comparing Yahoo® and Google® hierarchies only generates 10% of common instances. Moreover, in J. van Diggelen (2006), it is difficult to conclude if instances intersection is not complete (i.e., if one class does not contain all instances of another class), even if it is just a problem of miss-definition of concepts in one of the two ontologies.

CONCLUSION

The foregoing applications and associated embodiments should be considered as illustrative only, and numerous other embodiments can be configured using the techniques disclosed herein, in a wide variety of different applications.

It should also be understood that the omni ontology generation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The omni ontology generation techniques may be implemented using one or more processing platforms. One or more of the processing modules or other components may therefore each run on a computer, storage device or other processing platform element. A given such element may be viewed as an example of what is more generally referred to herein as a "processing device."

Figure 14:
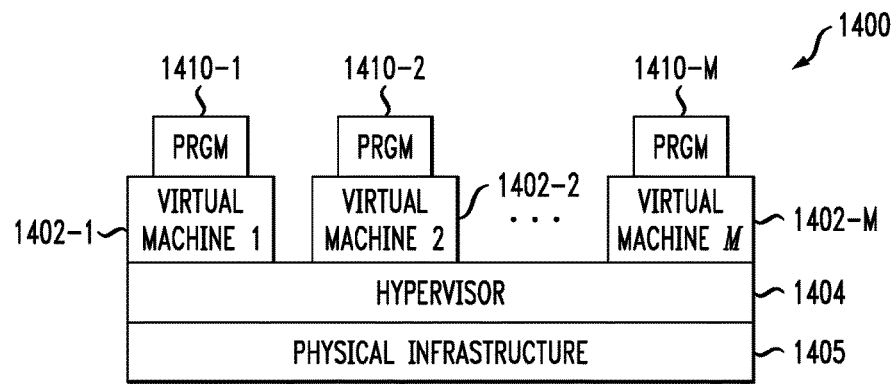
FIG. 14 illustrates an exemplary processing platform that may be used to implement at least a portion of one or more embodiments of the invention comprising a cloud infrastructure.

Referring now to FIG. 14, one possible processing platform that may be used to implement at least a portion of one or more embodiments of the invention comprises cloud infrastructure 1400. The cloud infrastructure 1400 in this exemplary processing platform comprises virtual machines (VMs) 1402-1, 1402-2, . . . 1402-M implemented using a hypervisor 1404. The hypervisor 1404 runs on physical infrastructure 1405. The cloud infrastructure 1400 further comprises sets of applications 1410-1, 1410-2, . . . 1410-M running on respective ones of the virtual machines 1402-1, 1402-2, . . . 1402-M under the control of the hypervisor 1404.

The cloud infrastructure 1400 may encompass the entire given system or only portions of that given system, such as one or more of client, servers, controller, authentication server or relying server in the system.

Although only a single hypervisor 1404 is shown in the embodiment of FIG. 14, the system may of course include multiple hypervisors each providing a set of virtual machines using at least one underlying physical machine.

An example of a commercially available hypervisor platform that may be used to implement hypervisor 1404 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 15:
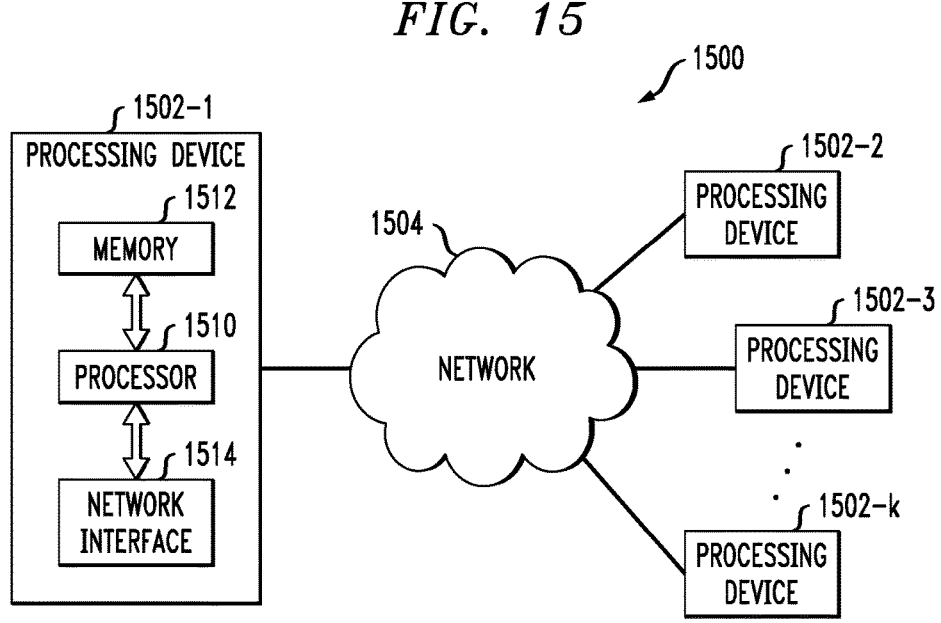
FIG. 15 illustrates another exemplary processing platform that may be used to implement at least a portion of one or more embodiments of the invention.

Another example of a processing platform is processing platform 1500 shown in FIG. 15. The processing platform 1500 in this embodiment comprises at least a portion of the given system and includes a plurality of processing devices, denoted 1502-1, 1502-2, 1502-3, . . . 1502-k, which communicate with one another over a network 1504. The network 1504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an application specific integrated circuit (ASIC), a field programmable gate array (FPGA) or other type of processing circuitry, as well as portions or combinations of such circuitry elements, and the memory 1512, which may be viewed as an example of a "computer program product" having executable computer program code embodied therein, may comprise random access memory (RAM), read only memory (ROM) or other types of memory, in any combination.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 14 or 15, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for integrating multi-channel heterogeneous data, comprising the steps of:
    obtaining a domain-specific mediator ontology;
    identifying a plurality of target channels;
    identifying entities pertinent to each of said plurality of channels;
    describing the entities pertinent to each of said plurality of channels using an ontology description language to generate a plurality of channel specific ontologies;
    aligning said channel specific ontologies with said domain-specific mediator ontology to generate aligned channel specific and domain-specific mediator ontologies;
    extracting a plurality of user identities from said plurality of channels;
    aligning, using at least one processing device, said plurality of extracted user identities across said plurality of channels to link common user identities;
    generating, using at least one processing device, at least one user profile for at least one of said aligned user identities; and
    correlating, using at least one processing device, the at least one user profile with said aligned channel specific and domain-specific mediator ontologies to generate an omni-channel ontology that integrates said multi-channel heterogeneous data.

2. The method of claim 1, wherein the domain-specific mediator ontology is one or more of based on a pre-existing upper ontology describing the domain and developed by a domain expert.

3. The method of claim 1, wherein the pertinent entities are selected using one or more of domain-specific information and information pertaining to individuals.

4. The method of claim 1, wherein the step of aligning said channel specific ontologies with said domain-specific mediator ontology uses the upper mediator ontology to define rules to align similar concepts across a plurality of said channel.

5. The method of claim 1, further comprising the step of assigning an omni identifier to a given aligned user identity to identify a given user associated with said given aligned user identity across said plurality of channels.

6. The method of claim 1, wherein the step of correlating at least one user profile with said aligned channel specific and domain-specific mediator ontologies translates said at least one user profile into an ontology description language.

7. The method of claim 1, further comprising the steps of storing said omni-channel ontology and processing queries of said omni-channel ontology.

8. A computer program product for integrating multi-channel heterogeneous data, comprising a non-transitory machine-readable storage medium having encoded therein executable code of one or more software programs, wherein the one or more software programs when executed by at least one processing device perform the following steps:
    obtaining a domain-specific mediator ontology;
    identifying a plurality of target channels;
    identifying entities pertinent to each of said plurality of channels;
    describing the entities pertinent to each of said plurality of channels using an ontology description language to generate a plurality of channel specific ontologies;

aligning said channel specific ontologies with said domain-specific mediator ontology to generate aligned channel specific and domain-specific mediator ontologies;

extracting a plurality of user identities from said plurality of channels;

aligning said plurality of extracted user identities across said plurality of channels to link common user identities;

generating at least one user profile for at least one of said aligned user identities; and correlating at least one user profile with said aligned channel specific and domain-specific mediator ontologies to generate an omni-channel ontology that integrates said multi-channel heterogeneous data.

9. The computer program product of claim 8, wherein the domain-specific mediator ontology is one or more of based on a pre-existing upper ontology describing the domain and developed by a domain expert.

10. The computer program product of claim 8, wherein the pertinent entities are selected using one or more of domain-specific information and information pertaining to individuals.

11. The computer program product of claim 8, wherein the step of aligning said channel specific ontologies with said domain-specific mediator ontology uses the upper mediator ontology to define rules to align similar concepts across a plurality of said channel.

12. The computer program product of claim 8, further comprising the step of assigning an omni identifier to a given aligned user identity to identify a given user associated with said given aligned user identity across said plurality of channels.

13. The computer program product of claim 8, wherein the step of correlating at least one user profile with said aligned channel specific and domain-specific mediator ontologies translates said at least one user profile into an ontology description language.

14. A system for integrating multi-channel heterogeneous data, comprising:
   a memory; and
   at least one processing device, coupled to the memory, operative to implement the following steps:
   obtaining a domain-specific mediator ontology;
   identifying a plurality of target channels;
   identifying entities pertinent to each of said plurality of channels;
   describing the entities pertinent to each of said plurality of channels using an ontology description language to generate a plurality of channel specific ontologies;
   aligning said channel specific ontologies with said domain-specific mediator ontology to generate aligned channel specific and domain-specific mediator ontologies;
   extracting a plurality of user identities from said plurality of channels;
   aligning said plurality of extracted user identities across said plurality of channels to link common user identities;
   generating at least one user profile for at least one of said aligned user identities; and
   correlating at least one user profile with said aligned channel specific and domain-specific mediator ontologies to generate an omni-channel ontology that integrates said multi-channel heterogeneous data.

15. The system of claim 14, wherein the domain-specific mediator ontology is one or more of based on a pre-existing upper ontology describing the domain and developed by a domain expert.

16. The system of claim 14, wherein the pertinent entities are selected using one or more of domain-specific information and information pertaining to individuals.

17. The system of claim 14, wherein the step of aligning said channel specific ontologies with said domain-specific mediator ontology uses the upper mediator ontology to define rules to align similar concepts across a plurality of said channel.

18. The system of claim 14, further comprising the step of assigning an omni identifier to a given aligned user identity to identify a given user associated with said given aligned user identity across said plurality of channels.

19. The system of claim 14, wherein the step of correlating at least one user profile with said aligned channel specific and domain-specific mediator ontologies translates said at least one user profile into an ontology description language.

20. The system of claim 14, further comprising the steps of storing said omni-channel ontology and processing queries of said omni-channel ontology.

\* \* \* \* \*